United States Patent
Seynaeve et al.

(10) Patent No.: US 12,263,829 B2
(45) Date of Patent: Apr. 1, 2025

(54) ELECTRIC VEHICLE WITH NEUTRAL REGENERATION

(71) Applicant: Dana Belgium N.V., Flanders (BE)

(72) Inventors: Koen B. Seynaeve, Veldegem (BE); Christophe De Buyser, Veldegem (BE); Kevin Vyncke, Bruges (BE); Pieterjan Jozef M. Cooreman, Bruges (BE)

(73) Assignee: DANA BELGIUM N.V., Bruges (BE)

(*) Notice: Subject to any disclaimer, the term of this patent is extended or adjusted under 35 U.S.C. 154(b) by 233 days.

(21) Appl. No.: 17/821,749

(22) Filed: Aug. 23, 2022

(65) Prior Publication Data
US 2023/0067532 A1 Mar. 2, 2023

Related U.S. Application Data

(60) Provisional application No. 63/260,790, filed on Aug. 31, 2021.

(51) Int. Cl.
| | |
|---|---|
| *B60L 7/18* | (2006.01) |
| *B60W 10/06* | (2006.01) |
| *B60W 10/08* | (2006.01) |
| *B60W 20/14* | (2016.01) |
| *B60W 20/15* | (2016.01) |
| *B60W 30/18* | (2012.01) |

(52) U.S. Cl.
CPC ............ *B60W 20/14* (2016.01); *B60W 10/06* (2013.01); *B60W 10/08* (2013.01); *B60W 20/15* (2016.01); *B60W 30/18072* (2013.01); *B60W 2540/10* (2013.01); *B60W 2710/083* (2013.01)

(58) Field of Classification Search
CPC ...... B60W 20/14; B60W 20/15; B60W 10/06; B60W 10/08; B60W 30/18072; B60W 2540/10; B60W 2710/083
See application file for complete search history.

(56) References Cited

U.S. PATENT DOCUMENTS

| | | | |
|---|---|---|---|
| 2013/0162009 A1* | 6/2013 | Mitts .................. | B60L 7/26 303/3 |
| 2015/0222209 A1* | 8/2015 | Crisp ............. | B60W 30/18127 318/376 |
| 2016/0264144 A1* | 9/2016 | Fontvieille ...... | B60W 30/18072 |

* cited by examiner

*Primary Examiner* — Jess Whittington
*Assistant Examiner* — Rami Nabih Bedewi
(74) *Attorney, Agent, or Firm* — McCoy Russell LLP

(57) ABSTRACT

Methods and systems for operating an electric vehicle in neutral are provided herein. The vehicle system, in one example, includes an electric machine rotationally coupled to a driveline and an input device with a neutral position. The system further includes a control unit with instructions that when executed, in response to movement of the input device into the neutral position, cause the control unit to operate the electric machine to apply a regenerative torque to a driveline and generate electrical energy.

14 Claims, 2 Drawing Sheets

ELECTRIC VEHICLE WITH NEUTRAL REGENERATION

CROSS REFERENCE TO RELATED APPLICATION

The present application claims priority to U.S. Provisional Application No. 63/260,790, entitled "ELECTRIC VEHICLE WITH NEUTRAL REGENERATION", and filed on Aug. 31, 2021. The entire contents of the above-listed application are hereby incorporated by reference for all purposes.

TECHNICAL FIELD

The present description relates generally to systems and methods for tuning regenerative braking corresponding to neutral operation of an electric vehicle (EV).

BACKGROUND AND SUMMARY

Some previous electric vehicle (EV) drivetrains have permitted the vehicle to coast when a shift lever is placed in a neutral position. These EVs may therefore exhibit deceleration behavior similar to full internal combustion engine (ICE) vehicles while in neutral. However, controlling deceleration in this manner, circumvents opportunities to increase vehicle efficiency by forgoing regeneration during neutral operation. This constraint to vehicle efficiency may pose a barrier to the EV achieving a desired operating range, in some circumstances. Further, the inventors have recognized that some vehicle operators have become increasingly accustomed to EV capabilities and may under certain circumstances want to expand the window of motor regeneration operation to increase vehicle range, for instance.

To enhance deceleration behavior and more generally at least partially overcome the abovementioned challenges, the inventors developed a vehicle system. The vehicle system includes an electric machine rotationally coupled to a driveline. The system further includes an input device with a neutral position. The system even further includes a control unit with instructions that when executed in response to movement of the input device into the neutral position, cause the control unit to: operate the electric machine to apply a regenerative torque to the driveline and generate electrical energy. In this way, system efficiency may be increased when compared to vehicle systems that are designed to coast when the shift lever is placed in neutral. Consequently, the EV's range may be extended, if desired.

In one example, the control unit may further include instructions that when executed in response to a depression of an accelerator pedal while the input device is in the neutral position, cause the control unit to: adjust the amount of regenerative torque applied to the driveline based on the accelerator pedal position and a vehicle speed. In this way, the system's deceleration behavior may be dynamically altered by the operator via interaction with the accelerator pedal while the vehicle operates in neutral. Consequently, operator appeal may be increased due to the higher level of adaptability afforded by this user tunable regenerative braking behavior.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

An electric vehicle (EV) system designed to proactively decelerate the vehicle and perform regenerative braking when a shift lever or other input device is placed in a neutral position, is described herein. The system may additionally enable an operator to actively adjust the amount of regenerative torque applied to a driveline via interaction with an accelerator pedal. For instance, while the system is operating in neutral, a control unit (e.g., a driveline control unit (DCU)) may command regenerative torque of one or more traction motors as a function of the actual vehicle speed and accelerator pedal depression that is defined by a linear interpolation between a first adjustable curve and a second adjustable curve. The first adjustable curve may represent neutral regeneration torque at 0% accelerator pedal depression as a function of actual vehicle speed and the second adjustable curve may represent neutral regeneration torque at 100% accelerator pedal depression as a function of the actual vehicle speed. Permitting the curves to be adjusted, increases system adaptability, and enables customers to tune the regenerative braking characteristics according to their predilection, thereby increasing customer satisfaction.

Herein, various types of torque are described. When a vehicle travels in a forward direction, traction torque refers to torque assisting forward travel, coasting torque refers to zero torque, and regenerative torque refers to torque resisting forward travel. When a vehicle travels in a reverse direction, traction torque refers to torque assisting reverse travel, coasting torque still refers to zero torque, and regenerative torque refers to torque resisting reverse travel. Thus, in all conditions, traction torque attempts to assist travel and regenerative torque attempts to resist travel. Traction torque may be interchangeably referred to as positive torque and regenerative torque may be referred to as negative torque.

Figure 1:
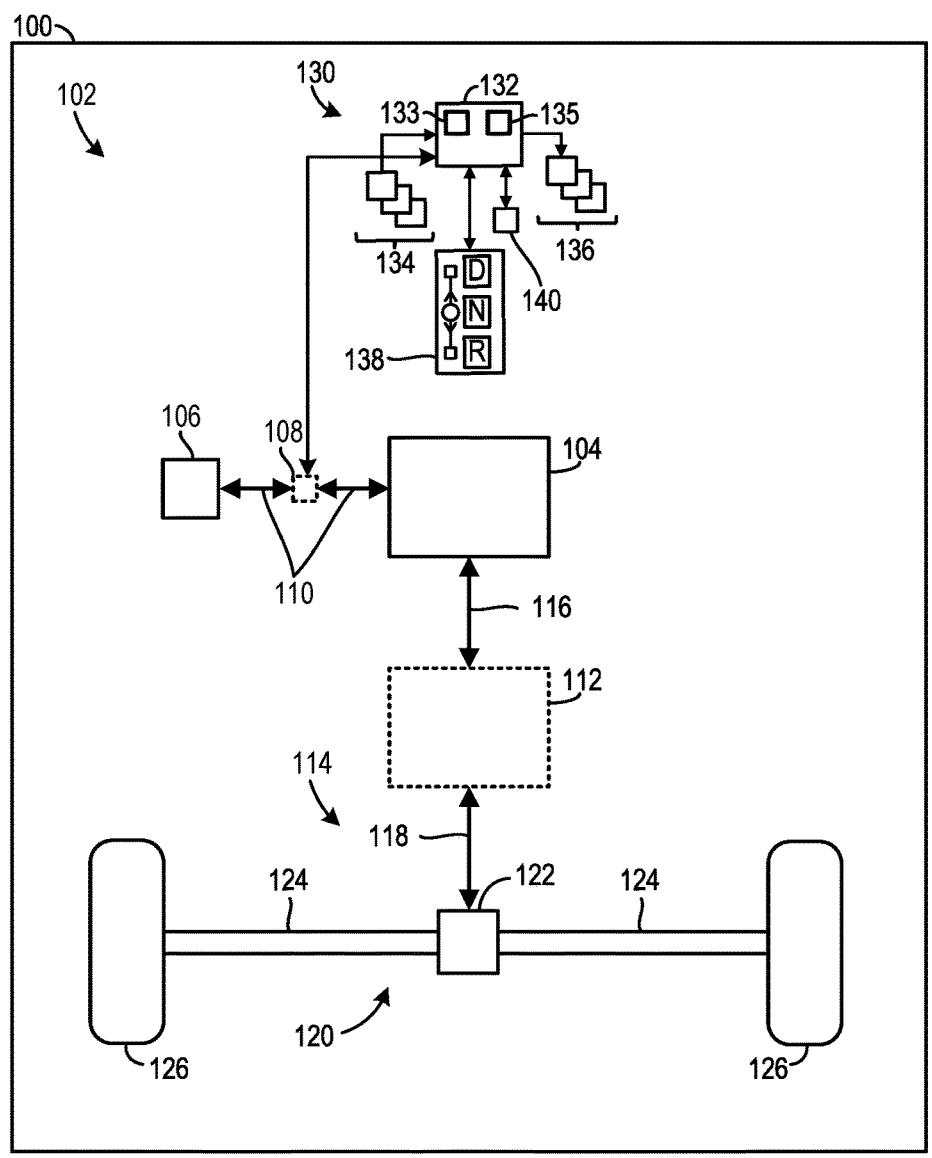
FIG. 1 shows a schematic representation of a vehicle with a drivetrain.

FIG. 1 shows a vehicle 100 with a system 102 that includes at least one electric machine 104 (e.g., a traction motor-generator). The vehicle is therefore an EV and may take a variety of forms in different embodiments such as a light, medium, or heavy duty vehicle.

The electric machine 104 may include conventional component for generating mechanical power (during forward or reverse drive modes) and electrical energy (during a regeneration mode). An energy storage device 106 (e.g., a traction battery, capacitor, and the like). During the forward and reverse drive modes, the energy storage device 106 transfers electrical energy to the electric machine 104, and conversely during regeneration operation, electrical energy is transferred from the electric machine to the energy storage device. In examples where the electric machine is a multi-phase motor-generator, an inverter 108 may be provided between the energy storage device and the motor. The inverter is designed to convert direct current (DC) to alternating current (AC) during forward and reverse drive operation and convert AC to DC during regeneration operation. Arrows 110 denote the flow of electrical energy between the energy storage device and the inverter as well as between the inverter and the electric machine.

As illustrated in FIG. 1, the electric machine 104 may be coupled to a transmission 112 (e.g., a multi-speed transmission) which may be coupled to a driveline 114. Arrow 116 denotes the mechanical connection between the electric machine 104 and the transmission 112 and arrow 118 signifies the mechanical connection between the transmission 112 and the driveline 114. These mechanical connections may be accomplished via shafts, gears, joints, belts, chains, combinations thereof, and the like. Alternatively, two electric machines may be rotationally coupled to parallel transmission inputs. Alternatively, the electric machine 104 may be directly coupled to the driveline 114 and the transmission 112 may be omitted from the vehicle, in certain embodiments. Specifically, in one example, the system 102 may include multiple electric machines. In such an example, each of the electric machines may be directly rotationally coupled to a different drive wheel. In such an example, in both forward and reverse drive operation, the electric machines may be rotated in opposite directions.

The driveline may include an axle assembly 120 with a differential 122 that is rotationally coupled to axle shafts 124 which are coupled to the drive wheels 126. As previously discussed, the transmission may be omitted from the vehicle and one or more electric machines may be coupled directly to the differential or directly to the drive wheels, for instance.

The vehicle 100 may further include a control system 130 with a controller 132, sensors 134, and actuators 136. The sensors 134 may include a wheel speed sensor(s), a driveline speed sensor, electric machine speed sensor, battery state of charge (SOC) sensor, an electric machine temperature sensor, an ambient temperature sensor, and the like. The actuators may be included in controllable components in the drivetrain such as a clutch control valves in the transmission, and the like.

The controller 132 may be configured as a conventional microcomputer that includes a microprocessor unit 133, input/output ports, memory 135 (e.g., read-only memory, random access memory, and/or keep alive memory), a controller area network (CAN) bus, and the like. In particular, the controller 132 may be designed as a control unit such as a driveline control unit (DCU) or a drivetrain or powertrain control unit. In such an example, the DCU may receive input data from other control units, such as a vehicle control unit (VCU), for instance. As such, the controller may receive input data from the various sensors as well as from other controllers on the vehicle CAN-bus, process the input data, and trigger the actuators in response to the processed input data based on instruction or code programmed therein corresponding to one or more routines.

The system 102 further includes an input device 138 (e.g., a drive mode selector such as a shift lever). The system may additionally include input devices 140 such as an accelerator pedal, a brake pedal, and the like. The input device 138 includes a neutral position and may also include a forward drive mode position and a reverse drive mode position. Alternatively, the input device may have different forward drive modes such as a first gear mode, a second gear mode, etc. Movement of the drive mode selector into the neutral position indicates an operator's intent to place the vehicle system in neutral and/or to stop accelerating. In neutral, the electric machine may be used for regeneration, under some operating conditions. As discussed in greater detail herein, the controller 132 may be designed to permit the operator to adjust the deceleration characteristics while the vehicle is in neutral.

Specifically, in the neutral operating mode, the controller 132 may be configured to adjust an amount of regenerative torque applied by the electric machine 104 to its rotor shaft and the driveline 114, correspondingly. Conversely, in the forward drive mode, the controller 132 may be configured to adjust the amount of traction torque applied by the electric machine to the driveline 114. It will be understood, that application of the traction torque causes the vehicle to travel in a forward direction in a forward operating mode. In a reverse operating mode, traction torque causes the vehicle to travel in a reverse direction, opposite the forward direction.

An axis system 150 is provided in FIG. 1, for reference. The z-axis may be a vertical axis (e.g., parallel to a gravitational axis), the x-axis may be a lateral axis (e.g., a horizontal axis), and/or the y-axis may be a longitudinal axis, in one example. However, the axes may have other orientations, in other examples.

Figure 2:
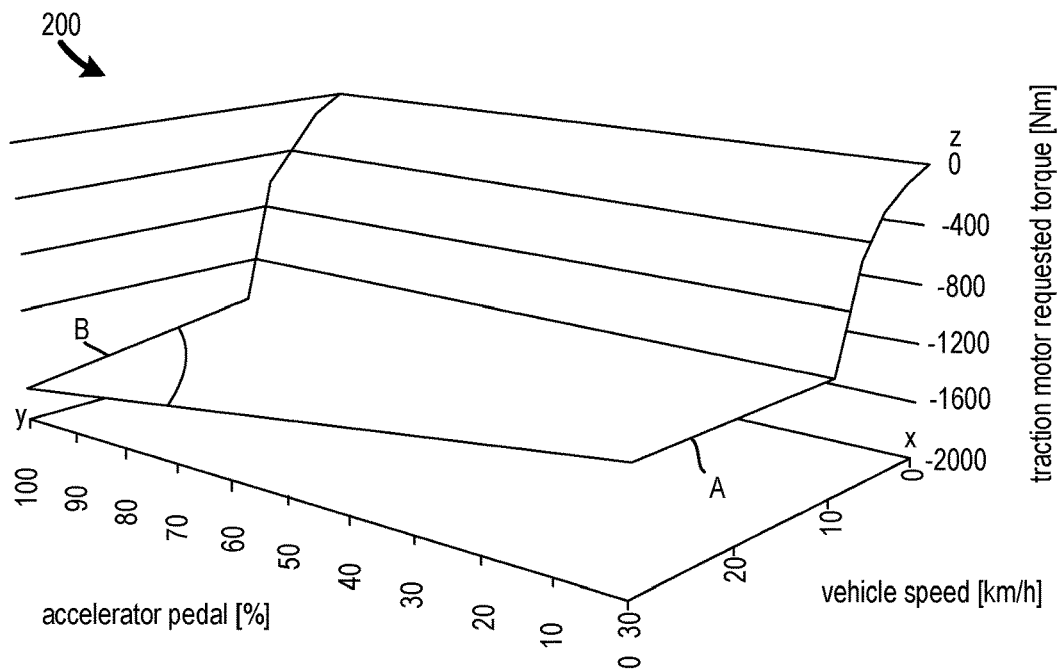
FIG. 2 shows a graphical representation of accelerator pedal position, vehicle speed, and traction motor requested torque during neutral-regeneration operation.

FIG. 2 shows a prophetic 3-dimensional (3-D) graph 200 with pedal position (expressed as a percentage of maximum pedal depression) on the y-axis, vehicle speed (expressed in kilometers per hour (km/h)) on the x-axis, and traction motor requested torque (expressed in Newton-meters (Nm)) on the z-axis. The sign of regeneration torque (e.g., traction motor requested torque) is opposite the sign of the rotation of the associated traction motor. Thus, higher negative values may be associated with a greater amount of regeneration torque. Although specific numerical values are provided on these axes, these numerical values may be altered based on a variety of factors such as electric motor size, vehicle size, transmission configuration, customer predilection, and the like. Curve (A) represents neutral regeneration torque at 0% accelerator pedal depression as a function of actual vehicle speed. Conversely, curve (B) represents neutral regeneration torque at 100% accelerator pedal depression as a function of actual vehicle speed. Both curve (A) and curve (B) may be adjustable. In this way, the adaptability of the system's regeneration behavior during neutral operation is increased.

When the drive mode input device (e.g., shift lever) is placed in neutral, the control unit (e.g., controller 132, shown in FIG. 1) may be configured for commanding regenerative torque generated by the electric machine(s) (e.g., the electric machine 104, shown in FIG. 1) as a function of the actual vehicle speed and the accelerator pedal position defined by a linear interpolation between curve (A) and curve (B). In this way, the system may be designed for simplified tunability of the regeneration behavior in neutral.

In one specific example, for higher vehicle speeds the control unit may have higher regeneration torque configured for curves (A) and (B) and conversely for lower vehicle speeds, the control unit may be designed to gradually transition to 0 Nm at vehicle standstill for both curve (A) and curve (B). Consequently, the system may generate a larger amount of electrical energy via regeneration operation while the vehicle is moving faster and then taper off regeneration operation as the vehicle approaches standstill to achieve a desired deceleration profile. In other words, the regenerative braking may be tuned such that it is gradually phased out when the vehicle approaches standstill. Consequently, the vehicle accelerating in an opposite and unintended direction is avoided.

In another example, at a given vehicle speed, higher regeneration torque may be generated at higher accelerator pedal percentages (e.g., more tipped-out or more inclined positions) relative to lower accelerator pedal percentages (e.g., more tipped-in or more declined positions). Thus, in one real-world example, as a vehicle operator depresses the accelerator pedal to signal a request to generate higher amounts of regeneration torque. Additionally or alternatively, upon being within a threshold of the vehicle standstill, the threshold based on the vehicle speed and a distance to the vehicle standstill, the regenerative torque may be gradually phased-out (e.g., reduced), independent of vehicle operator commands, to avoid acceleration in a reverse direction.

It will be understood, that the sign of the regeneration torque commanded to each traction motor may be opposite to the rotational speed of the electric motor. For a vehicle with two wheel hubs (e.g., left and right wheel hubs) of which the traction motors are rotating in opposite directions, the sign of the regeneration torques are also opposite one another.

Figure 3:
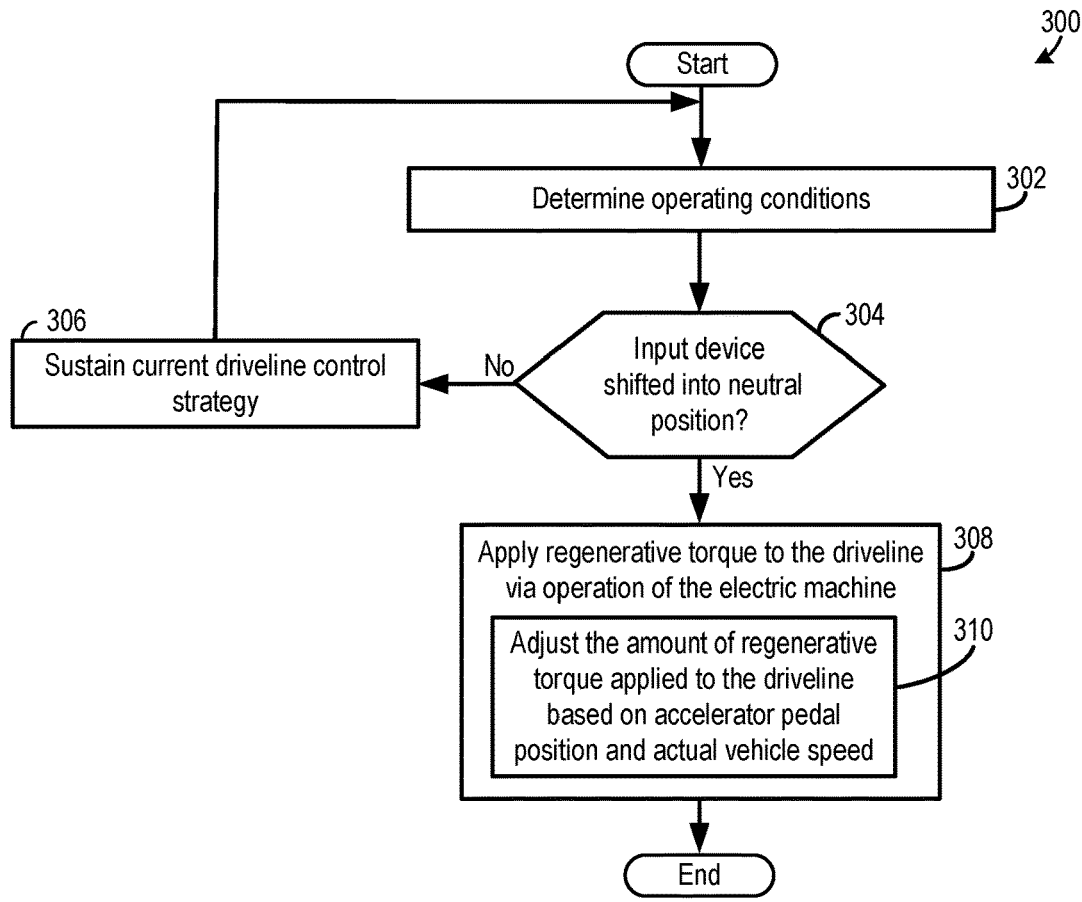
FIG. 3 shows a method for operation of a vehicle system.

A method 300 for operating a vehicle system is shown in FIG. 3. The method 300 may be implemented by the vehicle system and corresponding components described above with regard to FIG. 1. Alternatively, the method 300 may be implemented by other suitable vehicle systems and components. Instructions for carrying out the method 300 and the other control strategies described herein may be stored on a memory of a controller and executed by a processor of the controller in conjunction with signals received from sensors at the controller. The controller may employ actuators in system components to implement the method steps described below.

At 302, the method determines operating conditions. These operating conditions may include actual vehicle speed, input device position (e.g., shift lever position), accelerator pedal position, traction motor speed, traction motor temperature, traction battery SOC, and the like. These conditions may be ascertained via sensor inputs and/or modeling.

Next at 304, the method includes judging whether an input device, such as a shift lever, has been placed in its neutral position. This shift lever position judgement may be carried out via electronic communication between a sensor in the shift lever and the control unit. In one example, the vehicle operator may not directly adjust the shift lever position. The shift lever position may be automatically adjusted based on vehicle conditions impacted by vehicle operator inputs. The neutral position may be requested based on a declutch input. Declutch may be requested by the vehicle operator with a button on a hydraulics lever or by pressing a brake pedal. When the brake pedal is depressed, regenerative torque may be applied. Additionally or alternatively, the neutral position may be determined based on a park brake condition. When the park brake is activated, regeneration torque may be applied.

If the input device has not been placed in the neutral position (NO at 304), the method moves to 306. At 306, the method includes sustaining the current driveline control strategy. For instance, the control unit may allow the forward or reverse drive mode to persist in the system. As such, in the forward or reverse drive mode, the traction/coasting/regenerative torque applied to the driveline by the traction motor may correspond to accelerator pedal position.

Conversely, if the input device has been placed in the neutral position (YES at 304), the method moves to 308. At 308, the method includes applying regenerative torque to the driveline. The application of the regenerative torque may include step 310. At 310, the method includes adjusting the amount of regenerative torque applied to the driveline based on accelerator pedal position and actual vehicle speed. For instance, a greater amount of regenerative torque may be applied to the driveline as the operator further depresses the accelerator pedal and vice versa. In this way, the operator is permitted to actively adjust regenerative braking according to their preferences while the vehicle operates in neutral.

The technical effect of the vehicle system operating method described herein is to increase vehicle efficiency and range consequently, by implementing regenerative braking during neutral operation. Another technical effect of the vehicle system operating method is to provide a simplified scheme for regenerative braking tuning in neutral.

FIG. 1 shows example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a vehicle system is provided that comprises an electric machine rotationally coupled to a driveline; an input device with a neutral position; a control unit including instructions that when executed in response to movement of the input device into the neutral position, cause the control unit to: operate the electric machine to apply a regenerative torque to the driveline and generate electrical energy.

In another aspect, a method for operation of a vehicle system is provided that comprises while the vehicle system is in a neutral operation mode, operating a control unit to apply a regenerative torque to a driveline via operation of an electric machine, wherein the electric machine is rotationally coupled to the driveline and the vehicle system includes an input device that is in a neutral position. In one example, the method may further comprise, prior to applying the regenerative torque to the driveline, transitioning the vehicle system into the neutral operating mode in response to movement of an input device into a neutral position. In another example, the method may further comprise, in the neutral operating mode, adjusting the amount of regenerative torque applied to the driveline based on an accelerator pedal positon.

In any of the aspects or combinations of the aspects, the control unit may further include instructions that when executed in response to depression of an accelerator pedal while the input device is in the neutral position, cause the control unit to: adjust the amount of regenerative torque applied to the driveline based on the accelerator pedal position and a vehicle speed.

In any of the aspects or combinations of the aspects, the application of regenerative torque may be non-linear.

In any of the aspects or combinations of the aspects, the regenerative torque may be applied to the driveline based on a linear interpolation between two adjustable curves.

In any of the aspects or combinations of the aspects, the first adjustable curve may represent electric machine requested torque at a first accelerator pedal position as a function of vehicle speed and the second adjustable curve may represent electric machine requested torque at a second accelerator pedal position as a function of vehicle speed, wherein the first accelerator pedal position is 0% depression and the second accelerator pedal position is 100% depression.

In any of the aspects or combinations of the aspects, the first accelerator pedal positon may be different than the second accelerator pedal positon as a percentage of maximum accelerator pedal depression.

In any of the aspects or combinations of the aspects, the input device may be a shift lever.

In any of the aspects or combinations of the aspects, the control unit may be a driveline control unit (DCU).

In another representation, a driveline control unit is provided that is designed to, in a neutral mode of operation adjust a traction motor to alter an amount of regenerative braking applied to the driveline based on accelerator pedal position and/or vehicle speed.

The disclosure further provides support for a method for operation of a vehicle system, including while an input device of the vehicle system is in a neutral position, operating a control unit to apply a regenerative torque to a driveline via operation of an electric machine, wherein an amount of regenerative torque is based on an accelerator pedal position. A first example of the method further includes prior to applying the regenerative torque to the driveline, transitioning the vehicle system into a neutral operating mode in response to movement of the input device into the neutral position. A second example of the method, optionally including the first example, further includes where the input device is a shift lever. A third example of the method, optionally including one or more of the previous examples, further includes adjusting the amount of regenerative torque applied to the driveline based on an accelerator pedal positon. A fourth example of the method, optionally including one or more of the previous examples, further includes where the control unit is a driveline control unit (DCU). A fifth example of the method, optionally including one or more of the previous examples, further includes where the input device is adjusted to the neutral position in response to a vehicle speed. A sixth example of the method, optionally including one or more of the previous examples, further includes adjusting the amount of regenerative torque based on the accelerator pedal position in combination with a vehicle speed. A seventh example of the method, optionally including one or more of the previous examples, further includes where the amount of regenerative torque is reduced upon approaching a vehicle standstill.

The disclosure further provides support for a system for a vehicle including an electric machine rotationally coupled to a driveline, an input device comprising a forward position and a neutral position, and a control unit including instructions that when executed cause the control unit to operate the electric machine to apply a regenerative torque to the driveline and generate electrical energy based on a combination of a vehicle speed and a position of an accelerator pedal in response to movement of the input device into the neutral position. A first example of the system further includes where the application of the regenerative torque is based on only the vehicle speed when the accelerator pedal is not depressed. A second example of the system, optionally including the first example, further includes where the instructions further enable the control unit to gradually phase out application of the regenerative torque when approaching the vehicle standstill. A third example of the system, optionally including one or more of the previous examples, further includes where application of the regenerative torque occurs when the input device is moved to the neutral position via a vehicle operator, and wherein the application of the regenerative torque increases as the accelerator pedal is more depressed. A fourth example of the system, optionally including one or more of the previous examples, further includes where the regeneration torque is configurable via a linear interpolation based on a first accelerator pedal position and a second accelerator pedal position, a vehicle operator selecting which of the first accelerator pedal position and the second accelerator pedal position applies more regenerative torque.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle and/or transmission control system, where the described actions are carried out by executing the instructions in a system including the various hardware components in combination with the electronic controller. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. Thus, the configurations and routines disclosed herein are exemplary in nature, and that these specific examples are not to be considered in a limiting sense, because numerous variations are possible. For example, the above technology can be applied to powertrains that include different types of propulsion sources including different types of electric machines, and/or transmissions. The subject matter of the present disclosure includes all novel and non-obvious combinations and subcombinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle system, comprising:
an electric machine rotationally coupled to a driveline;
an input device with a neutral position;
a control unit including instructions that when executed, in response to movement of the input device into the neutral position, cause the control unit to:
operate the electric machine to apply a regenerative torque to the driveline and generate electrical energy,
wherein the control unit further includes instructions that when executed, in response to actuation of an accelerator pedal while the input device is in the neutral position, cause the control unit to:
adjust an amount of regenerative torque applied to the driveline based on a position of the accelerator pedal and a vehicle speed.

2. The vehicle system of claim 1, wherein the application of the regenerative torque is non-linear.

3. The vehicle system of claim 1, wherein the regenerative torque is applied to the driveline based on a linear interpolation between a first adjustable curve and a second adjustable curve.

4. The vehicle system of claim 3, wherein the first adjustable curve represents an electric machine requested torque at a first accelerator pedal position as a function of vehicle speed and the second adjustable curve represents an electric machine requested torque at a second accelerator pedal position as a function of vehicle speed.

5. The vehicle system of claim 4, wherein the first accelerator pedal position, expressed as a percentage of maximum accelerator pedal depression, is less than the second accelerator pedal position, and wherein the first accelerator pedal position is 0% of the maximum accelerator pedal depression and the second accelerator pedal position is 100% of the maximum accelerator pedal depression.

6. The vehicle system of claim 1, wherein the input device is a shift lever.

7. A method for operation of a vehicle system, comprising:
while an input device of the vehicle system is in a neutral position, operating a control unit to apply a regenerative torque to a driveline via operation of an electric machine, wherein an amount of regenerative torque is based on an accelerator pedal position; and
prior to applying the regenerative torque to the driveline, transitioning the vehicle system into a neutral operating mode in response to movement of the input device into the neutral position,
wherein the input device is a shift lever.

8. The method of claim 7, wherein the control unit is a driveline control unit (DCU), and wherein the DCU is configured to receive input data from other control units including a vehicle control unit (VCU).

9. The method of claim 7, further comprising adjusting the amount of regenerative torque based on the accelerator pedal position in combination with a vehicle speed.

10. The method of claim 7, wherein the amount of regenerative torque is reduced upon approaching a vehicle standstill.

11. A system for a vehicle, comprising:
an electric machine rotationally coupled to a driveline;
an input device comprising a forward position and a neutral position;
a control unit including instructions that when executed cause the control unit to:
operate the electric machine to apply a regenerative torque to the driveline and generate electrical energy based on a combination of a vehicle speed and a position of an accelerator pedal in response to movement of the input device into the neutral position,
wherein application of the regenerative torque occurs when the input device is moved to the neutral position via a vehicle operator, and wherein the application of the regenerative torque increases as the accelerator pedal is more depressed.

12. The system of claim 11, wherein the application of the regenerative torque is based on only the vehicle speed when the accelerator pedal is not depressed.

13. The system of claim 11, wherein the instructions further enable the control unit to gradually phase out application of the regenerative torque when approaching a vehicle standstill.

14. The system of claim 11, wherein the regenerative torque is configurable via a linear interpolation based on a first accelerator pedal position and a second accelerator pedal position, the vehicle operator selecting which of the first accelerator pedal position and the second accelerator pedal position applies more regenerative torque.

* * * * *